US012374092B2

(12) United States Patent
Lindt et al.

(10) Patent No.: US 12,374,092 B2
(45) Date of Patent: Jul. 29, 2025

(54) IMAGE ANALYSIS MODEL COMPRISING AN INTEGER COUPLING LAYER

(71) Applicant: Robert Bosch GmbH, Stuttgart (DE)

(72) Inventors: Alexandra Lindt, Hamburg (DE); Emiel Hoogeboom, Amsterdam (NL); William Harris Beluch, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 438 days.

(21) Appl. No.: 17/650,786

(22) Filed: Feb. 11, 2022

(65) Prior Publication Data

US 2022/0277559 A1    Sep. 1, 2022

(30) Foreign Application Priority Data

Mar. 1, 2021  (DE) .................... 10 2021 104 807.9

(51) Int. Cl.
G06V 10/82  (2022.01)
G06N 3/084  (2023.01)
G06V 10/774  (2022.01)

(52) U.S. Cl.
CPC .......... G06V 10/82 (2022.01); G06N 3/084 (2013.01); G06V 10/774 (2022.01)

(58) Field of Classification Search
CPC ...... G06V 10/82; G06V 10/774; G06N 3/084; G06N 3/092; G06N 3/0464; G06N 20/00
See application file for complete search history.

(56) References Cited

U.S. PATENT DOCUMENTS

2020/0035016 A1* 1/2020 Muller .................... G06T 15/06
2022/0292397 A1* 9/2022 Takahashi ............... H04L 67/10

OTHER PUBLICATIONS

Hoogeboom, Emiel, et al. "Integer Discrete Flows and Lossless Compression." arXiv preprint arXiv: 1905.07376 (2019).https://arxiv.org/abs/1905.07376 (Year: 2019).*

Jang, Eric, Shixiang Gu, and Ben Poole. "Categorical reparameterization with gumbel-softmax." arXiv preprint arXiv: 1611.01144 (2016). https://arxiv.org/abs/1611.01144 (Year: 2016).*

(Continued)

*Primary Examiner* — Xuemei G Chen
*Assistant Examiner* — Han Hoang
(74) *Attorney, Agent, or Firm* — NORTON ROSE FULBRIGHT US LLP (57) ABSTRACT

A computer-implemented method of training an image analysis model. A coupling layer determines an output vector of integer values from an input vector of integer values. The coupling layer is applied by dividing the input vector into non-overlapping first and second input parts; applying a machine learnable submodel of the coupling layer to the first input part to obtain a submodel output of the machine learnable submodel; sampling a transformation vector from a discrete probability distribution, wherein the discrete probability distribution is parameterized based on the submodel output; determining a second output part based on the second input part and the transformation vector; and combining the first input part and the second output part to obtain the output vector. During backpropagation, a gradient of the sampling of the transformation vector is estimated.

15 Claims, 5 Drawing Sheets

(56) References Cited

OTHER PUBLICATIONS

Salimans, Tim, et al. "Pixelcnn++: Improving the pixelcnn with discretized logistic mixture likelihood and other modifications." arXiv preprint arXiv: 1701.05517 (2017).https://arxiv.org/pdf/1701.05517 (Year: 2017).*

Hoogeboom et al., "Integer Discrete Flows and Lossless Compression," 33rd Conference On Neural Information Processing Systems (Neurips 2019), Vancouver, Canada, 2019, pp. 1-11. https://proceedings.neurips.cc/paper/2019/file/9e9a30b74c49d07d8150c8c83b1ccf07-Paper.pdf Downloaded Feb. 10, 2022.

Kingma et al., "Adam: a Method for Stochastic Optimization," Cornell University, 2017, pp. 1-15. https://arxiv.org/pdf/1412.6980.pdf.

Jang et al., "Categorical Reparameterization With Gumbel-Softmax," Cornell University, 2017, pp. 1-13. https://arxiv.org/pdf/1611.01144.pdf Downloaded Feb. 10, 2022.

Williams, "Simple Statistical Gradient-Following Algorithms for Connectionist Reinforcement Learning," Springer, Machine Learning, vol. 8, 1992, pp. 229-256.

Tucker et al., "Rebar: Low-Variance, Unbiased Gradient Estimates for Discrete Latent Variable Models," 31st Conference On Neural Information Processing Systems (NIPS 2017), Long Beach, CA, USA, 2017, pp. 1-10. <https://proceedings.neurips.cc/paper/2017/file/ebd6d2f5d60ff9afaeda1a81fc53e2d0-Paper.pdf> Downloaded Feb. 10, 2022.

Grathwohl et al., "Backpropagation Through the Void: Optimizing Control Variates for Black-Box Gradient Estimation," Cornell University, 2018, pp. 1-17. https://arxiv.org/pdf/1711.00123.pdf Downloaded Feb. 10, 2022.

\* cited by examiner

IMAGE ANALYSIS MODEL COMPRISING AN INTEGER COUPLING LAYER

CROSS REFERENCE

The present application claims the benefit under 35 U.S.C. § 119 of German Patent Application No. DE 10 2021 104 807.9 filed on Mar. 1, 2021, which is expressly incorporated herein by reference in its entirety.

FIELD

The present invention relates to a computer-implemented method of training an image analysis model, and to a corresponding system. The present invention further relates to a computer-implemented method of applying the trained image analysis model, and to a corresponding system. The present invention further relates to a computer-readable medium.

BACKGROUND INFORMATION

Automated image analysis using machine learning is used in a wide variety of applications. For example, in autonomous or semi-autonomous vehicles, image analysis is used to detect dangerous traffic situations. Similarly, in the medical world, analysis of MRI scans, CT scans, or other types of medical images can be used to detect anomalies, to classify tumours, and the like. In many applications, it is particularly useful if an image analysis model is, at least approximately and/or stochastically, invertible. For example, this enables the model to be used for generating synthetic images by applying it in the inverse direction. Another application that this enables is image compression. Image analysis can be used to represent an image in terms of values of parameters of a probability distribution. By using shorter encodings for more common parameter values, lossy or even lossless image compression can be achieved.

In the paper "Integer Discrete Flows and Lossless Compression" by E. Hoogeboom et al. (available at https://arxiv.org/abs/1905.07376 and incorporated herein by reference), a flow-based generative model for ordinal discrete data is described. The model is built up from so-called Integer Discrete Flows. These are subcomponents of the model that take a set of integer values as input and output, and that are invertible. The fact that the model works on integers makes it particularly suited for images. Images are typically stored discretely, e.g., as 8-bit pixel values. In order for a continuous model to work with images, latent space quantization is needed, resulting in reconstruction errors in the image space. In particular, models with latent space quantization are not suited for lossless compression. By working directly with integer values, Integer Discrete Flows circumvent this problem.

In particular, the above paper describes a so-called integer discrete coupling layer. The layer acts on an input vector of integer values and outputs an output vector of integer values. The input vector is divided into non-overlapping first and second input parts. The output consists of the first input part and of a value obtained by a so-called conditional transformation, involving applying a neural network to the first input part; rounding to the nearest integer; and adding the result to the second input part. The inverse of the coupling layer is computed by undoing the conditional transformation.

SUMMARY

The conventional coupling layer on integer vectors has the problem that the rounding operation in the coupling layer introduces a bias in the gradients obtained by backpropagation. As a consequence, training by backpropagation deviates from the optimal solution. This results in suboptimal trained models. For example, efficiency of image compression, accuracy of anomaly detection, or representativeness of generated images to the training dataset is impacted. This is a problem in particular when using several conventional integer discrete coupling layers in sequence. In such cases, the bias accumulates and thus the quality of the trained model is more severely affected. However, in many cases it is needed to use multiple layers, e.g., to model more complex training sets.

It would be desirable to train an image analysis model with coupling layers such that it results in a trained model with improved performance, in particularly when using multiple coupling layers in sequence.

In accordance with a first aspect of the present invention, a computer-implemented method and a corresponding system are provided for training an image analysis model. In accordance with another aspect of the present invention, a computer-implemented method and a corresponding system are provided for applying the trained image analysis model. In accordance with an aspect of the present invention, a computer-readable medium is provided.

Various measures of the present invention relate to an image analysis model with an improved coupling layer. The coupling layer may be configured to determine an output vector of integer values from an input vector of integer values. To apply the coupling layer to an input vector of integer values, the input vector may be divided into non-overlapping first and second input parts. The first input part may be included in the output vector. To determine a second output part of the output vector, a machine learnable submodel of the coupling layer may be applied to the first input part to obtain a submodel output. Interestingly, the submodel output may be used to parameterize a discrete probability distribution, from which, at least during training, a transformation vector, e.g., of integers or other discrete values, may be sampled. The second output part may then be determined based on the second input part and the sampled transformation vector, for example by transforming the second input part according to the transformation vector.

Interestingly, by performing a sampling according to a discrete probability distribution and then using the resulting discrete transformation vector to determine the second output part, e.g., by integer addition, it is possible to directly obtain a second output part of integer values. No rounding of the second output part is needed. Because this does not involve rounding, there is no need to deal with this rounding during backpropagation. Instead, while backpropagating the model output through the image analysis model, a gradient of the sampling of the transformation vector may be estimated, for which various techniques can be used that are conventional. In particular, the gradient estimator may be an unbiased estimator, or in any case an estimator with a reduced bias. Thus, backpropagation bias caused by rounding is avoided, leading to a less biased and thereby more accurate model.

In accordance with an example embodiment of the present invention, the image analysis model may comprise a sequence of coupling layers, e.g., wherein the input of a coupling layer depends on the output of a previous coupling layer. For example, the model may comprise a sequence of at least two, at least five, or at least ten coupling layers. In case of such stacking it is particularly important to reduce bias since it otherwise accumulates.

The advantageous image analysis model may be applied in at least two ways: first, by obtaining an input image and applying the image analysis model to the input image to obtain a model output, and second, by obtaining a model output and applying an inverse of the image analysis model to the model output to obtain an input image. The use of a coupling layer is beneficial because it allows the model to be used efficiently in both directions, since it is invertible. In both cases, use of the model may involve applying the machine learnable submodel of the coupling layer to a first input part of the coupling layer to obtain a submodule output which parameterizes a discrete probability distribution. A transformation vector may be selected from this distribution that may then be used to determine the input vector or output vector of the coupling layer, as desired. During use, the selecting may involve sampling from the probability distribution, but other types of selection, e.g., selecting the most likely value, are also possible. In particular, for various applications, in particular for lossless compression, it is advantageous to use a deterministic selection.

Optionally, applying the machine learnable submodel may comprise applying a convolutional neural network, or any other type of neural network. Neural networks, and convolutional neural networks in particular, are particularly suited for image analysis, e.g., to extract low-level or mid-level features from images. Thus, using such models as machine learnable submodels results in good performance for images. Moreover, neural networks are typically amenable to gradient-based optimization and thus combine particularly well with gradient estimation techniques for estimating the gradient of the sampling.

Optionally, sampling the transformation vector may comprise sampling from a discretized logistic distribution. The discretized logistic distribution is advantageous for at least two reasons. The first reason is that the mean is one of the parameters of the distribution. This makes it efficient to deterministically select a transformation vector based on the distribution by just selecting the mean. It also allows adding the second input part to the mean of the probability distribution, so that the second output part may be determined by selecting it according to the probability distribution.

The second reason that the discretized logistic distribution is advantageous, is that there are high-quality gradient estimators in the literature. In particular, the gradient of the sampling may be estimated by a REINFORCE-based gradient estimator, for example REINFORCE, REBAR, or RELAX.

Optionally, the gradient of the sampling may be estimated by a Gumbel-Softmax gradient estimator. This is another high-quality gradient estimator that can be used, for example, in combination with a categorial distribution.

Optionally, the image analysis model may be configured to determine a representation of an input image in terms of a set of parameters of a probability distribution. Such a representation may be used for example for (lossless or lossy) image compression, synthetic image generation, anomaly detection, feature extraction, or may be input to a further machine learning model. Models representing images in terms of parameters of a probability distribution are also advantageous since they can be effectively trained by maximum likelihood estimation, e.g., the model may induce a probability distribution over input images, with respect to which the log-likelihoods of training images may be maximised.

The image analysis models described herein have many practical applications, several of which are now discussed.

In an example embodiment of the present invention, the model may be used for compression and decompression of an input image. To compress, the image analysis model may be applied to the input image, and a lossy or lossless compression function may be applied to the model output to obtain a compression of the input image. To decompress, a lossy or lossless decompression function may be applied to a compression of an input image to obtain the model output, and the inverse of the image analysis model may be applied to the model output to recover the input image. The coupling layer described herein may enable efficient evaluation of the model in both directions. Moreover, because the model output is more representative of the training dataset, better compression of images that are similar to those of the training dataset is achieved. Interestingly, this often leads to better general-purpose compression as well.

In an example embodiment of the present invention, the image analysis model may be used for anomaly detection. The image analysis model may be applied to the input image to obtain the model output, wherein the model output represents the input image in terms of a set of parameters of a probability distribution. Based on the set of parameters, a conformance value may be determined, for example, by a likelihood estimation. The conformance value may indicate a conformance of the input image to the training dataset. The conformance value may be output, e.g., may result in further action: e.g., an alert may be raised if an insufficient conformance, e.g., an anomaly, is detected. By using an image analysis model as described herein, accuracy of the determined conformance is improved.

In an example embodiment of the present invention, the image analysis model may be used to generate synthetic images. The model output may represent an input image in terms of a set of parameters of a probability distribution. A model output may be obtained by sampling the set of parameters from the probability distribution. The sampling and/or sampled model output may be customized to manipulate the image generation as desired. The inverse of the image analysis model may be applied to the model output to determine a synthetic image representative of the training dataset. Image analysis models as described herein are particularly suited for synthetic image generation since they may be efficiently evaluated in the inverse direction, including the coupling layer; and because by using a coupling layer as described herein, images can be generated that are more representative of the training dataset. Synthetic data can be used for various applications, such as training set augmentation for training a task-specific upstream model, e.g., a deep neural network. The provided techniques thereby result in better upstream models as well.

In an example embodiment of the present invention, the image analysis model may be used as a feature extractor for a control system for controlling a computer-controlled machine, e.g., a robot, an autonomous or semiautonomous vehicle, a domestic appliance, a manufacturing machine, or a personal assistant. The control system may capture an input image of the machine and/or its environment; apply the image analysis model to the input image to obtain a model output; and use the model output to control the machine, e.g., to determine a control signal to be provided to an actuator for controlling the machine. For example, the control system may apply a further machine learning model to determine the control signal, e.g., trained using reinforcement learning or the like. Because the model output more accurately represents the input image, or in other words, is more optimal in terms of feature extraction, better control may be achieved.

The provided techniques are applicable to various types of images, e.g., camera images or videos, radio images, LiDAR data, ultrasonic data, motion data, or thermal images. Various other types of data can be represented as images and in this way be processed using the provided techniques as well, audio data or time-series data being examples. The model also does not need to be an image analysis model, e.g., it can be a model trained on and used for non-image data, such as audio data or time-series sensor data. Various data that is represented as discrete units can be processed using the described models and the described coupling layer in particular, leading to the discussed advantages.

It will be appreciated by those skilled in the art that two or more of the above-mentioned embodiments, implementations, and/or optional aspects of the invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
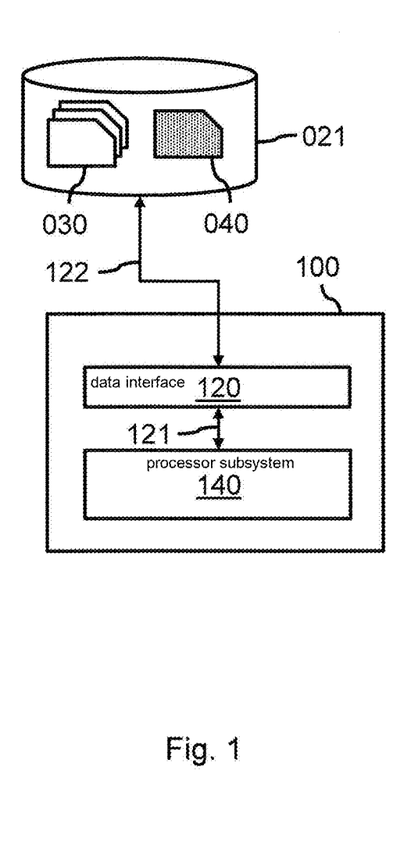
FIG. 1 shows a system for training a machine learning model, in accordance with an example embodiment of the present invention.

FIG. 1 shows a system 100 for training a machine learning model. The system 100 may comprise a data interface 120 for accessing a training dataset 030. The training dataset 030 may comprise one or more training input instances for the machine learning model, for example, at least 1000 or at least 100000 training input instances. In an embodiment, the machine learning model may be an image analysis model, with the training input instances being training images. For example, a training image may be at least 32×32 or at least 128×128 in size, and may have one (greyscale or black-and-white), three (RGB, etc.) or more channels. However, the machine learning model may also be applicable to various other input instances, e.g., sensor data such as audio data or time-series sensor data. Although images are used throughout this specification as a motivating example, the skilled person can readily adapt the presented techniques to other kinds of input data.

The model may comprise one or more coupling layers as described herein. Such a coupling layer may be configured to determine an output vector of integer values from an input vector of integer values.

The data interface 120 may also be for accessing a set of parameters 040 of the model. For example, the number of parameters 040 may be at least 10000, at least 100000, or at least 1000000. The set of parameters 040 may comprise parameters of a machine learnable submodel of a coupling layer of the model. The parameters may be for use according to a method described herein, e.g., by system 200 of FIG. 2 or system 300 of FIG. 3.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, train the model. To train the model, the processor subsystem 140 may be configured to apply the model to a training image or other training input instance of the training dataset to determine a model output. Applying the model may comprise applying the coupling layer to the input vector. To this end, processor subsystem 140 may be configured to divide the input vector into non-overlapping first and second input parts; processor subsystem 140 may be configured to apply a machine learnable submodel of the coupling layer to the first input part to obtain a submodel output of the machine learnable submodel; processor subsystem 140 may be configured to sample a transformation vector from a discrete probability distribution, wherein the discrete probability distribution is parameterized based on the submodel output; processor subsystem 140 may be configured to determining a second output part based on the second input part and the transformation vector; processor subsystem 140 may be configured to combine the first input part and the second output part to obtain the output vector.

To train the model, processor subsystem 140 may be further configured to backpropagate the model output through the model. The backpropagating may comprise estimating a gradient of the sampling of the transformation vector.

The system 100 may further comprise an output interface for outputting trained parameters 040 of the learned (or 'trained') model. For example, as also illustrated in FIG. 1, the output interface may be constituted by the data interface 120, with said interface being in these embodiments an input/output ('IO') interface, via which the trained parameters 040 may be stored in the data storage 021. For example, parameters 040 of the 'untrained' model may during or after the training be replaced, at least in part, by the parameters 040 of the trained model, in that the parameters of the model, such as weights and other types of parameters of neural networks, may be adapted to reflect the training on the training data 030. This is also illustrated in FIG. 1 by the same reference numerals 040 being used to denote untrained and trained parameters in the data storage 021. In other embodiments, the trained parameters may be stored separately from the untrained parameters. In some embodiments, the output interface may be separate from the data interface 120, but may in general be of a type as described above for the data interface 120.

Figure 2:
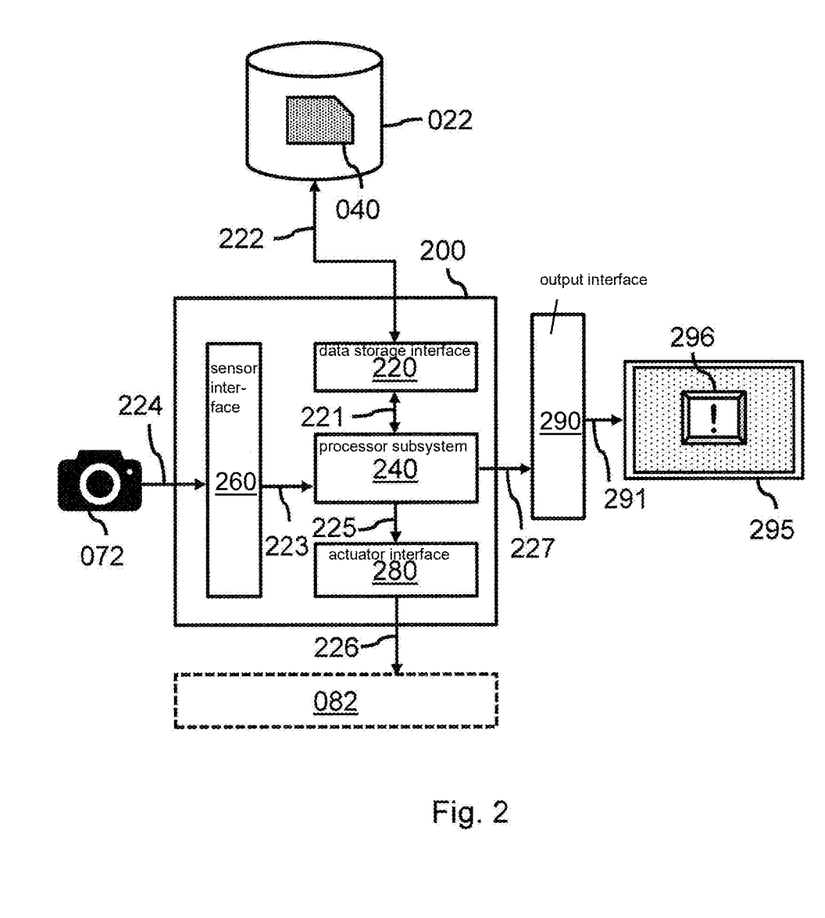
FIG. 2 shows a system for applying a machine learning model, in accordance with an example embodiment of the present invention.

FIG. 2 shows a system 200 for applying a machine learning model. The machine learning model can be an image analysis model or other type of model, as also discussed with respect to FIG. 1. The model may comprise a coupling layer configured to determine an output vector of integer values from an input vector of integer values.

The system may comprise a data interface for accessing a set of parameters 040 of the model. The model may have been trained on a training dataset according to a method described herein, e.g., by system 100 of FIG. 1. The set of parameters 040 may comprise parameters of a machine learnable submodel of the coupling layer. The system may train the model in addition to applying it, e.g., the system 200 may be combined with the system 100 of FIG. 1.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and the data storage 021. The data storage 022 may further comprise an input instance, e.g., sensor data, to which the model is applied in a forward direction, and/or a model output to which the model is applied in an inverse direction.

The system 200 may further comprise a processor subsystem 240 which may be configured to, during operation of the system 200, apply the model. Processor subsystem 240 may apply the model in the forward and/or inverse direction. When applying the model in the forward direction, processor subsystem 240 may be configured to obtain an input instance, e.g., an input image, and apply the model to the input instance to obtain a model output. When applying the model in the inverse direction, processor subsystem 240 may be configured to obtain a model output and apply an inverse of the model to the model output to obtain an input instance, e.g., an input image. Both when applying the model in the forward model and when applying the model in the inverse direction, processor subsystem 240 may be configured to apply the machine learnable submodel of the coupling layer to a first input part of the coupling layer to obtain a submodule output of the machine learnable submodel, and to select a transformation vector based on a discrete probability distribution parameterized based on the submodel output.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for accessing sensor data 224 acquired by a sensor 072 in an environment 082. The model may then be applied in the forward direction to the sensor data. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. In the example illustrated in the figure, the sensor 072 is an image sensor, e.g., a camera. The sensor data 224 may be image data, e.g., video data, radar data, LiDAR data, ultrasonic data, motion data, or thermal image data. In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on a model output of applying the model in the forward direction. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments, the system 200 may comprise an output interface 290 to a rendering device 295, such as a display, a light source, a loudspeaker, a vibration motor, etc., which may be used to generate a sensory perceptible output signal 296 which may be generated based on a model output determined by applying the model in the forward direction, or of a model input determined by applying the model in the inverse direction. The sensory perceptible output signal 196 may be directly indicative of the determined model output or input, but may also represent a derived sensory perceptible output signal, e.g., for use in guidance, navigation or other type of control of the physical system.

In some embodiments, system 200 may be configured to generate one or more synthetic model inputs, e.g., images, representative of the training dataset on which the model has been trained. The generated synthetic model inputs may for example be used, by system 200 or another system, to train a further machine learning model. For example, the model output may represent model inputs in terms of a set of parameters of a probability distribution. Processor subsystem 240 may be configured to obtain the model output by sampling the set of parameters from the probability distribution; and to apply the inverse of the model, in other words, to apply the model in the inverse direction, to the model output to determine a synthetic model input representative of the training dataset. For example, the output interface may be used to output the generated model inputs or a further machine learning model trained based on it. This is an example of an application of the model in which a sensor interface and actuator interface are not needed.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may represent a control system configured to control the physical entity.

Figure 3:
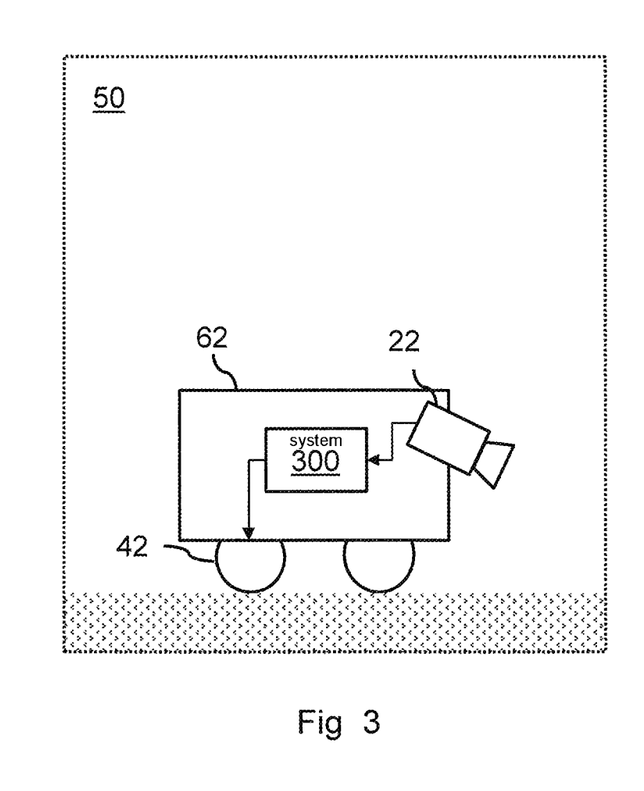
FIG. 3 shows an example of a use of a trained image analysis model in a control system of an (semi-)autonomous vehicle, in accordance with an example embodiment of the present invention.

FIG. 3 shows an example of the above, in that the system for applying the model is shown to be a control system 300 of an (semi-)autonomous vehicle 62 operating in an environment 50. The autonomous vehicle 62 may be autonomous in that it may comprise an autonomous driving system or a driving assistant system, with the latter also being referred to as a semiautonomous system. The autonomous vehicle 62 may for example incorporate system 300 to control the steering and the braking of the autonomous vehicle based on sensor data obtained from a video camera 22 integrated into the vehicle 62.

For example, the system 300 may control an electric motor 42 to perform (regenerative) braking in case the autonomous vehicle 62 is in an unexpected traffic situation. The system 300 may control the steering and/or braking to avoid accidents. For that purpose, the system 300 may apply the model to an input image of the environment 50 of the vehicle 62, thus obtaining a model output. The model output may represent the input image in terms of a set of parameters of a probability distribution. Based on this set of parameters, a conformance value may be determined. The conformance value may indicate a conformance of the input image to the training dataset. If the conformance value indicates insufficient conformance, an unexpected traffic situation may be detected and appropriate action may be taken. Instead of or in addition to steering/breaking, this may involve alerting the driver and/or switching to a manual driving mode, for example.

As another example, the control system 300 may use the image analysis model as a feature extractor for use in controlling the vehicle 62. For example, detection of an unexpected traffic situation or other controlling of the vehicle 62 may be performed by a further machine learning model based on the model output of the image analysis model.

Generally, coupling layers as described herein may be applied in a wide range of image analysis models or other types of machine learning models. The image analysis model can for example be an image feature extraction model; an image generation model, when used in the inverse direction; or an image anomaly detection model. Thus, the model output of the model can also be of various types. In various embodiments, the model output is a set of parameters of a probability distribution, e.g., of a joint distribution of several probability distributions. For example, the number of parameters can be at least 128, at least 1024, or at least 2048. The model output can for example also be an image, e.g., the model may be an image-to-image transformation model. For example, the output image can have the same size as the input image.

The model can comprise one or more coupling layers as described herein, e.g., at least 4 or at least 8. The coupling layers may be applied in parallel, e.g., to respective parts of a layer input, and/or in sequence, e.g., in different layers with the input of one coupling layer being based on the output of another coupling layer.

The model can follow various conventional architectures that are conventional in the related art. The model can be a flow-based generative model, e.g., a model that represents a data distribution by performing multiple invertible transformations on a base distribution. The model can be an invertible model, e.g., a model that, in use, can deterministically determine a model output from a model input in a forward direction, and can deterministically determine a model input from a model output in an inverse direction. The function defined by the inverse direction may be an inverse of the function defined by the forward direction. Coupling layers as described herein may be evaluated efficiently both in the forward and in the inverse direction and so may be particularly suitable for use in invertible models.

As a concrete example, the model can be based on the architecture described in "Integer Discrete Flows and Lossless Compression", with one, several, or all of the integer discrete coupling layers replaced by coupling layers as described herein. For example, the model may comprise one or more squeeze operations, one or more channel permutations, and one or more factor out layers. For example, the model may comprise one or more levels. A level may comprise a squeeze layer for reducing spatial dimensions, e.g., by a factor two, four, or more, and increasing the number of channels accordingly, e.g., by a factor four, sixteen, or more; followed by one or more integer flows comprising a channel permutation and a coupling layer as described herein; followed by a factor-out layer. Generally, in any machine learning model, one, more, or all coupling layers having input and/or output vectors of integer values may be advantageously replaced by coupling layers as described herein. Here, a coupling layer is generally referred to as a layer that can be evaluated in the forward and inverse directions, typically based on including an input part in the model output.

The model may be trained by backpropagation. Generally, backpropagation-based training may involve selecting one or more training images; applying the model to the images; and deriving a training signal by backpropagating the model outputs through the model. For example, the training signal may be configured to optimize an objective function. The model may be configured to determine a representation of an input image in terms of a set of parameters of a probability distribution. The objective function may comprise a log-likelihood of the training data that is to be maximised. Based on the training signal, parameters of the model may be updated, which may include the parameters of the machine learnable submodel, parameters of the probability distribution, and/or any other trainable parameters of the model.

Training may be performed using stochastic approaches such as stochastic gradient descent, e.g., using the Adam optimizer as described in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches, e.g., of at most or at least 64 or at most or at least 256 instances.

Figure 4A:
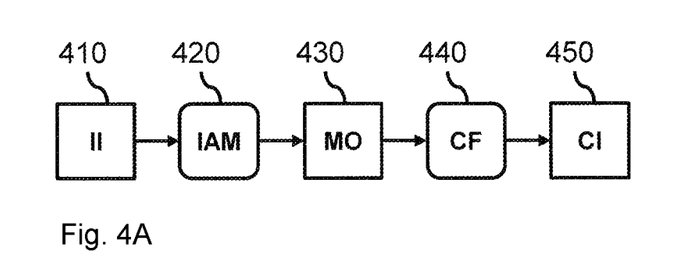
FIG. 4A shows a detailed example of how to compress an image, in accordance with an example embodiment of the present invention.

FIG. 4A shows a detailed, yet non-limiting, example of how to compress an image using an image analysis model IAM, 420, as described herein. The image analysis model IAM is applied to an input image II, 410, to obtain a model output MO, 430, for example, a set of parameters of a probability distribution. A compression function CF, 440, may be applied to the model output MO to obtain a compression CI, 450, of the input image II. The compression function can be lossless or lossy. Examples of compression functions that work on a set of parameters of a probability distribution are given in "Integer Discrete Flows and Lossless Compression".

Figure 4B:
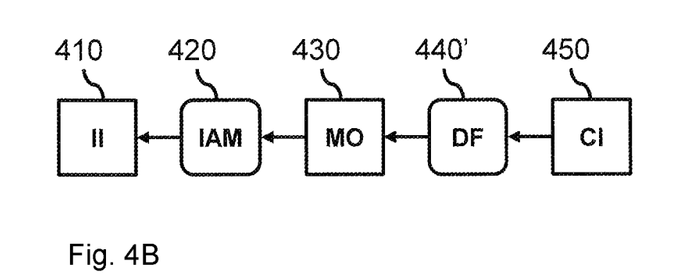
FIG. 4B shows a detailed example of how to decompress an image, in accordance with an example embodiment of the present invention.

FIG. 4B shows a detailed, yet non-limiting, example of how to decompress an image using an image analysis model IAM, 420, as described herein. In this example, a decompression function DF, 440', may be applied to a compression CI, 450, of an input image to obtain the model output MO, 430. The decompression function DF may be lossy or lossless, and can optionally be progressive. The inverse of the image analysis model IAM may be applied to the model output MO, in other words, the model IAM may be applied in the inverse direction, to recover the input image II, 410. Examples of compression functions are given in "Integer Discrete Flows and Lossless Compression"; in these examples, model output MO represents a set of parameters of a probability distribution.

Figure 5A:
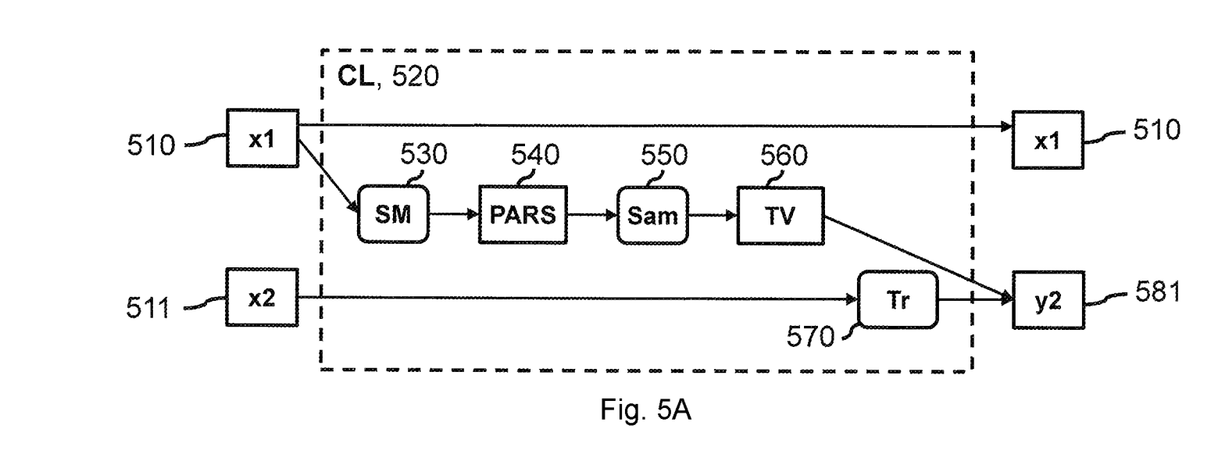
FIG. 5A shows a detailed example of how to apply a coupling layer, in accordance with an example embodiment of the present invention.

FIG. 5A shows a detailed, yet non-limiting, example of how to apply a coupling layer CL, 520, in the forward direction. This example is applicable both to training a model comprising a coupling layer an to applying such a model.

Coupling layer CL may be configured to determine an output vector of integer values, e.g., positive and/or negative whole numbers, from an input vector of integer values, e.g., positive and/or negative whole numbers. For example, the input vector and the output vector may be of the same size. The input vector and/or the output vector may comprise at least 16, at least 32, or at least 128 integer values, for example. The term "vector" means here data comprising multiple integers; it does not preclude the input or output vectors from having a particular structure, e.g., the input and/or output vector may represent or comprise a two-dimensional or three-dimensional volume, e.g., an activation volume.

Thus, applying a model comprising coupling layer CL may comprise applying a first part of the model to a model input to obtain the input vector of the coupling layer CL; applying the coupling layer CL to obtain the output vector of the coupling layer CL; and applying a further party of the model to at least the output vector of the coupling layer to obtain a model output of the model.

The input vector of the coupling layer CL may be divided into a first input part x1, 510 and a second input part x2, 511, that may be non-overlapping. The input vector may be split into the two parts x1, x2 according to various splits. For example, the first input part may comprise a subset of channels of an activation volume represented by the input vector, and the second input part may comprise the remaining channels. It was found to be beneficial for first input part x1 to comprise at least as many integer values as second input part x2, e.g., at least twice as many or at least three times as many. Both parts may comprise multiple values, e.g., first input part x1 and/or second input part x2 may comprise at least 16 or at least 32 integer values. It is in principle possible to divide the input vector into two parts in other ways than splitting, e.g., generally, any invertible function from the set of input vectors to the set of pairs of first and second input parts may be used.

The coupling layer may comprise a machine learnable submodel SM, 530, that may be applied to the first input part x1 to obtain a submodel output of the machine learnable submodel. Various types of machine learnable submodel SM can be used. The machine learnable submodel SM does not need to have integer outputs: the outputs can be continuous. The machine learnable submodel SM also does not need to be invertible, e.g., the submodel output can have fewer features than the input part x1 to which it is applied. Conventional machine learnable models can be used. For example, submodel SM may comprise an artificial neural network, such as a deep neural network. For example, submodel SM may comprise at least 5 or at least 10 layers, and/or comprise at least 1000 or at least 10000 nodes and/or weights. Depending on the particular application, various conventional architectures for neural networks and other types of machine learnable model may be used. It is generally beneficial from the point of view of efficiency of training to use a machine learnable submodel SM which is amenable to gradient-based optimization, e.g., which is continuous and/or differentiable in its set of parameters.

In particular, submodel SM may comprise a convolutional neural network, e.g., a neural network comprising one or more convolutional layers. In a convolutional layer, a convolution operator may be applied to an input volume to obtain an output volume. There can be at least two or at least five convolutional layers, for example. The model may comprise other layers, e.g., fully connected layers, as well. Convolutional neural networks are particularly suited to images and similar types of model inputs.

The submodel output may represent or otherwise define a set of parameters PARS, 540, of a discrete probability distribution. From this discrete probability distribution, a transformation vector TV, 560, may be selected according to the set of parameters PARS. This may involve sampling the transformation vector TV according to the set of parameters. This is typically done during training, for example. In use, it is also possible to perform sampling, but this makes the layer non-deterministic, which may be undesirable. As an alternative to sampling, the transformation vector TV can be selected deterministically from the support of the probability distribution, e.g., by selecting the most likely output according to the set of parameters PARS, e.g., the mean.

Various discrete probability distributions may be used. For example, selected transformation vectors TV can be vectors of integers, for example, of the same size as second input party x2. The discrete probability distribution is typically not a trivial distribution, e.g., there are typically multiple transformation vectors that have a nonzero probability of being sampled according to the set of parameters. The set of possible values is a discrete set, however, e.g., a set of integer values or a finite or infinite subset thereof, or any other finite or infinite discrete set.

One possible discrete probability distribution is the categorical distribution. This distribution may be parameterized by respective probabilities for respective possible transformation vectors TV or respective elements of the transformation vector TV. To deterministically select a transformation vector TV, a possible transformation vectors TV with highest probability may be selected.

Another possible discrete probability distribution is a discretized logistic distribution. This distribution may be parameterized by respective means p and standard deviations a for respective elements of the transformation vector TV. To deterministically select a transformation vector TV, respective means may be selected, for example.

A second output part y2, 581 of the output vector may be determined by transforming Tr, 570, the second input part x2 according to the transformation vector TV. The transformation is preferably deterministic and invertible, and leads to an integer result y2. For example, the transformation can be addition or subtraction. The transformation vector TV may be a vector of integer values, but depending on the type of transformation Tr, other types of discrete transformation vectors TV are possible as well.

The first input part x1 and the second output part y2 may be combined to obtain the output vector. Typically, the first input part x1 and the second output part y2 are concatenated, e.g., as x1∥y2. That is, the output vector may comprise the first input part x1 and the second output part y2. In principle, however, other invertible maps from the first input part x1 and second output part y2 to the output vector may be used.

Interestingly, coupling layer CL may be efficiently trained by backpropagation. In backpropagation, an output vector, e.g., x1∥y2, may be backpropagated through the coupling layer CL. This may involve estimating a gradient of the sampling Sam of the transformation vector TV. Because sampling Sam is performed instead of rounding, the bias introduced by rounding may be avoided. In particular, the gradient may be estimated with an unbiased, or at least less biased, estimator. Various gradient estimation techniques that are conventional may be used.

As an example, the sampling Sam may be approximated by a differential approximation that is annealed during the training. In an embodiment, the gradient of the sampling Sam may be sampled by a Gumbel-Softmax gradient estimator. This estimator may provide a differential approximation of a categorical sampling operation that can be annealed during training. For example, the techniques of E. Jang et al., "Categorical Reparameterization with Gumbel-Softmax" (available at https://arxiv.org/abs/1611.01144 and incorporated herein by reference) may be used.

As another example, the gradient of the sampling Sam may be estimated by a REINFORCE-based gradient estimator. This is discussed in more detail with respect to FIG. 6A. There, the sampling is performed according to a transformed second input part, but the same techniques can also be applied in the present setting where the sampling is performed e.g. according to parameters PARS independent from the second input part x2.

Figure 5B:
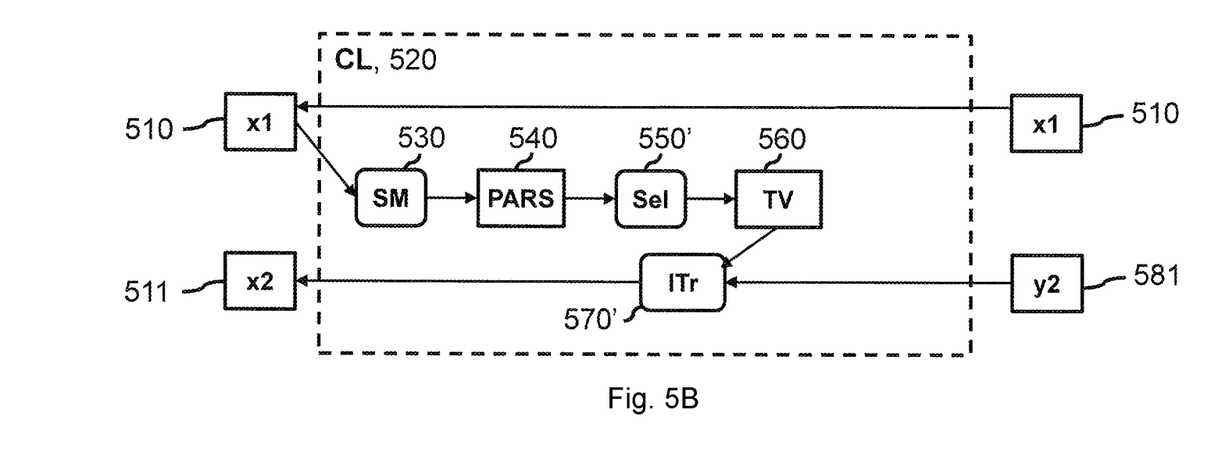
FIG. 5B shows a detailed example of how to apply an inverse coupling layer, in accordance with an example embodiment of the present invention.

FIG. 5B shows a detailed, yet non-limiting, example of how to apply an inverse coupling layer, in other words, how to apply a coupling layer CL, 520, in the inverse direction. The coupling layer of FIG. 5B is the same as that of FIG. 5A, e.g., it has the same trained parameters. In particular, the submodel SM, 530, is the same and is parameterized by the same set of parameters.

In this figure, coupling layer CL is applied in the inverse direction to determine its input vector from its output vector.

Based on the output vector, a first input part x1, 510, and a second output part y2, 581, may be determined. This may be done by inverting the process used to determine the output vector in FIG. 5A, e.g., by splitting the output vector into two parts x1, y2 according to the same split used when training the model.

Interestingly, since the first input part x1 can be derived from the output vector, it is now possible to apply machine learnable submodel SM to the first input part x1 to obtain a submodel output, as in FIG. 5A. As in that figure, the submodel output may define parameters PARS, 540, of a discrete probability distribution, from which a transformation vector TV may be selected Sel, 550'. As in FIG. 5A, this may be done by sampling; in the example of this figure, to get deterministic inverse, the transformation vector TV is deterministically selected according to the probability distribution.

Second input part x2 may be then be selected based on parameters PARS and second output part y2 by applying an inverse transformation ITr, 570' of the transformation Tr of FIG. 5A to the second output party y2 according to transformation vector TV. For example, the transformation vector TV may be subtracted from the second output part y2. The input vector may be obtained by combining the first input part x1 and second input part x2 corresponding to the way the input is split in FIG. 5A, e.g., by concatenation.

It may be observed that the computation of FIG. 5B indeed provides an inverse of the computation of FIG. 5A. Deterministically applying the coupling layer in the forward direction followed by the inverse direction, and/or in the inverse direction followed by the forward direction, may result in an identity transformation, e.g., for each possible input vector or output vector. The coupling layer may be an invertible map on the whole set of integers. Stochastically applying the layers may result in corresponding probability distributions, in which at least a mean or most likely value may be preserved.

Figure 6A:
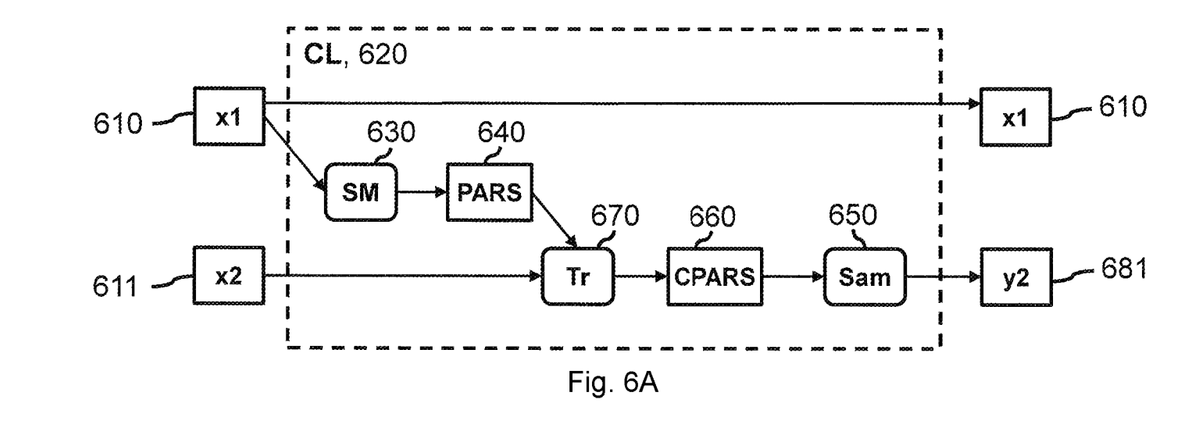
FIG. 6A shows a detailed example of how to apply a coupling layer, in accordance with an example embodiment of the present invention.

FIG. 6A shows a detailed, yet non-limiting, example of how to apply an inverse coupling layer. This example is based on that of FIG. 5A. Unless otherwise noted, implementation options discussed with respect to FIG. 5A also apply here.

In particular, as in that figure, an input vector may be divided into a non-overlapping first input part x1, 610, and second input part x2, 611. A machine learnable submodel SM, 630, of the coupling layer may be applied to the first input part x1 to obtain a submodel output of the machine learnable submodel. The submodel output may define parameters PARS, 640, of a discrete probability distribution.

In this figure, second output part y2, 681, is determined based on the second input part x2 and a transformation vector by first transforming Tr, 670, the parameters PARS based on the second input part x2 to obtain combined parameters CPARS, 660, and then sampling Sam, 650, a transformation vector according to the combined parameters CPAR. The transformation vector in this case defines, e.g., is equal to, the second output part y2. Thus, the discrete probability distribution is parameterized by the submodel output but also by the second input part x2. As in FIG. 5A, instead of sampling, other ways of selecting are also possible.

For example, the parameters PARS may comprise a mean of the discrete probability distribution. Transformation TR may involve adding the second input part x2 to the mean of parameters PARS. Sampling Sam according to this transformed mean may be seen to correspond to first sampling according to a non-transformed mean and then adding the second input part to the sampled value, e.g., as in FIG. 6A. Deterministically selecting second output part y2 may be performed by selecting the mean given by the combined parameters CPAR. For example, the discrete probability distribution can be a discretized logistic distribution. This distribution may be parametrized by a mean p and a standard deviation a per output, as also discussed with respect to FIG. 5A.

However, other types of transformations Tr are also possible and it is also not needed that the transformation Tr of the parameters before sampling corresponds to a transformation of the sampled value y2 after sampling.

Similarly to FIG. 5A, the output vector may be determined by combining the first input part x1 and the second output part y2, e.g., through concatenation.

When backpropagating an output vector through the coupling layer CL, the gradient of the sampling Sam may be estimated by a REINFORCE-based gradient estimator, e.g., a gradient estimator using the so-called "log-derivative trick". REINFORCE-based gradient estimators may be used to estimate sampling from a categorical distribution, such as a discretized logistic distribution. For example, the REINFORCE-based gradient estimator may be a REINFORCE gradient estimator, e.g., as described in R. Williams, "Simple statistical gradient-following algorithms for connectionist reinforcement learning", Machine learning 8(3-4), 1992; a REBAR gradient estimator, e.g., as described in G. Tucker et al., "REBAR: Low-variance, unbiased gradient estimates for discrete latent variable models" (available at https://arxiv.org/abs/1703.07370 and incorporated herein by reference); or a RELAX gradient estimator, e.g., as described in W. Grathwohl et al., "Backpropagation through the void: Optimizing control variates for black-box gradient estimation" (available at https://arxiv.org/abs/1711.00123 and incorporated herein by reference). Interestingly, in these and other cases, unbiased sampling can be performed.

Figure 6B:
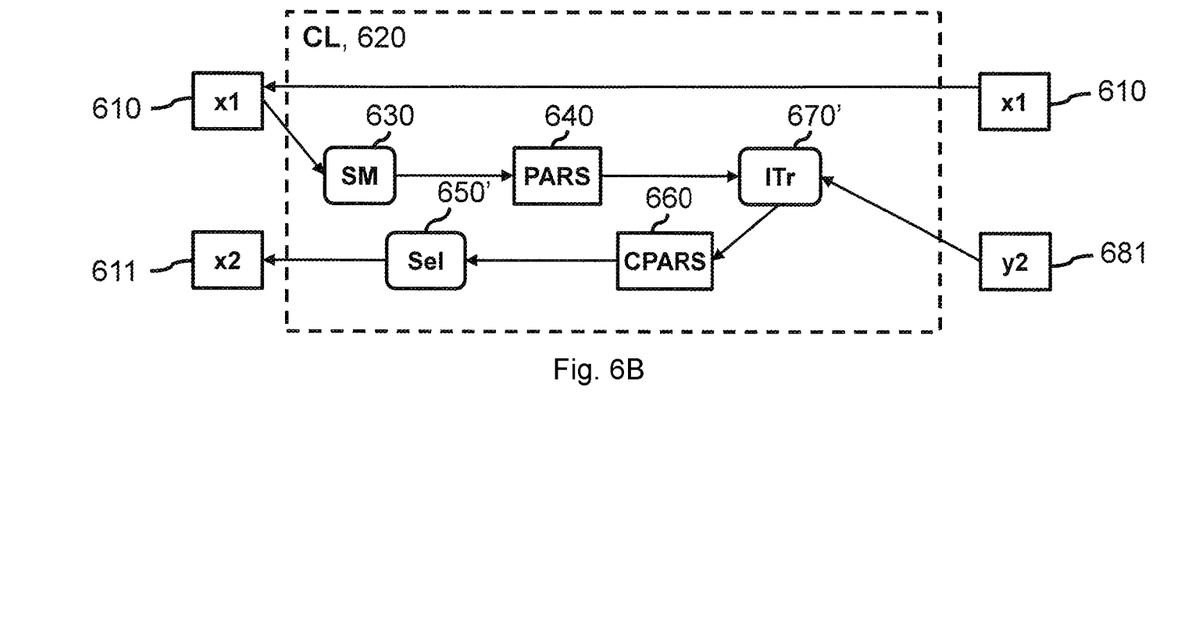
FIG. 6B shows a detailed example of how to apply an inverse coupling layer, in accordance with an example embodiment of the present invention.

FIG. 6B shows a detailed, yet non-limiting, example of how to apply an inverse coupling layer. In this example, an inverse of coupling layer CL of FIG. 6A is applied, in other words, coupling layer CL, 620 is applied in the inverse direction.

Similarly to FIG. 5B, given an output vector, a first input part x1, 610, and second output part y2, 681 may be determined. Machine learning submodel SM, 630, may be applied to first input part x1 to obtain a submodel output defining a set of parameters PARS, 640 of a discrete probability distribution. In this example, second input part x2, 611 may be selected based on parameters PARS and second output part y2 by first applying an inverse transformation ITr, 570', of the transformation of FIG. 6A to the parameters PARS and the second output part y2 to obtain combined parameters CPARS, 660, e.g., by subtracting the mean of the parameters PARS from the second output part y2 to obtain a combined mean. Second input part x2 may be selected Sel, 650', from combined parameters CPARS, e.g., by sampling or by selecting the most probable element. The input vector may be determined by combining the first and second input parts x1,x2, e.g., by concatenation x1∥x2.

As for FIG. 5B, it may be noted that this procedure gives a deterministic or stochastic inverse of the coupling layer of FIG. 5A. It is noted that the coupling layer of FIG. 6A can also be used in combination with the inverse coupling layer of FIG. 5B. The inverse coupling layer of FIG. 6B can also be used as inverse of the coupling layer of FIG. 5A (for discrete probability distributions with a mean or similar transformable parameters, for example).

Figure 7:
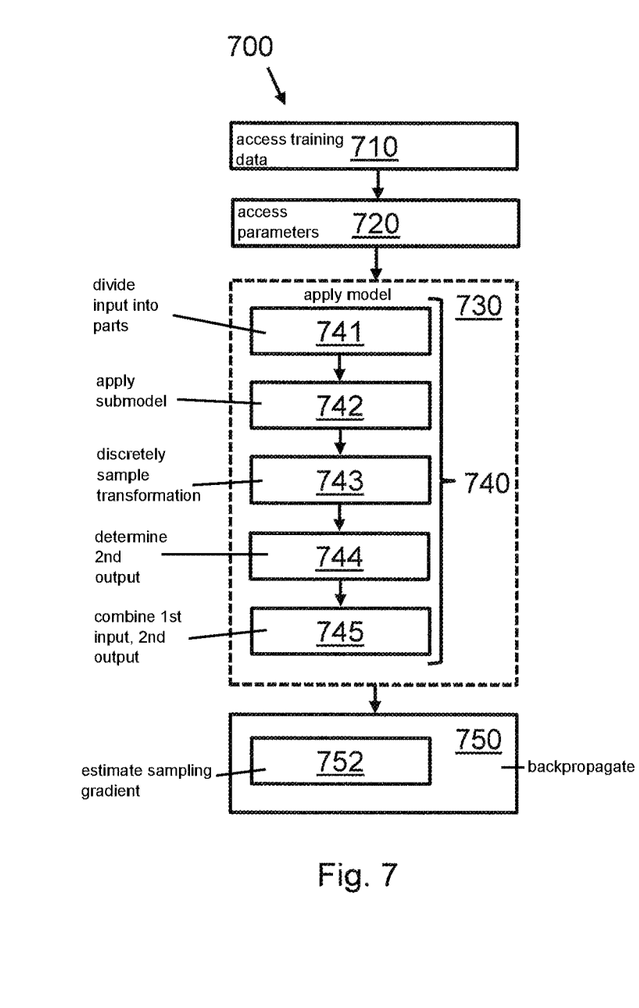
FIG. 7 shows a computer-implemented method of training a model, in accordance with an example embodiment of the present invention.

FIG. 7 shows a block-diagram of computer-implemented method 700 of training a machine learnable model, e.g., an image analysis model. The model may comprise a coupling layer configured to determine an output vector of integer values from an input vector of integer values. The method 700 may correspond to an operation of the system 100 of FIG. 1. However, this is not a limitation, in that the method 700 may also be performed using another system, apparatus or device.

The method 700 may comprise, in an operation titled "ACCESS TRAINING DATA", accessing 710 a training dataset, wherein the training dataset comprises one or more training input instances, e.g., training images.

The method 700 may comprise, in an operation titled "ACCESS PARAMETERS", accessing 720 a set of parameters of the model. The set of parameters may comprise parameters of a machine learnable submodel of the coupling layer.

The method 700 may comprise, in an operation titled "APPLY MODEL", applying 730 the model to a training input instance of the training dataset to determine a model output. The applying 730 may comprise, in an operation titled "APPLY COUPLING LAYER", applying 740 the coupling layer to the input vector.

Applying 740 the coupling layer may comprise, in an operation titled "DIVIDE INPUT IN PARTS", dividing 741 the input vector into non-overlapping first and second input parts. Applying 740 the coupling layer may comprise, in an operation titled "APPLY SUBMODEL", applying 742 a machine learnable submodel of the coupling layer to the first input part to obtain a submodel output of the machine learnable submodel. Applying 740 the coupling layer may comprise, in an operation titled "DISCRETELY SAMPLE TRANSFORMATION", sampling 743 a transformation vector from a discrete probability distribution. The discrete probability distribution may be parameterized based on the submodel output. Applying 740 the coupling layer may comprise, in an operation titled "DETERMINE 2ND OUTPUT", determining 744 a second output part based on the second input part and the transformation vector. Applying 740 the coupling layer may comprise, in an operation titled "COMBINE 1ST INPUT, 2ND OUTPUT", combining 745 the first input part and the second output part to obtain the output vector.

The method 700 may comprise, in an operation titled "BACKPROPAGATE", backpropagating 750 the model output through the model. Backpropagating 750 may comprise, in an operation titled "ESTIMATE SAMPLING GRADIENT", estimating 752 a gradient of the sampling of the transformation vector.

Figure 8:
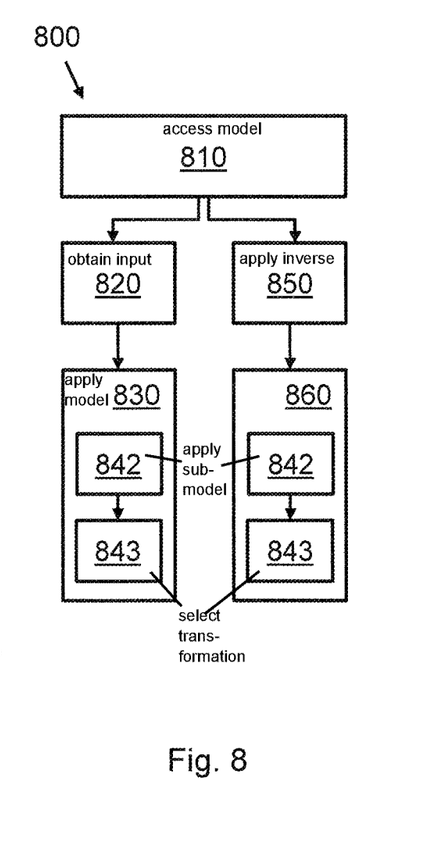
FIG. 8 shows a computer-implemented method of applying a model, in accordance with an example embodiment of the present invention.

FIG. 8 shows a block-diagram of computer-implemented method 800 of applying a machine learnable model, e.g., an image analysis model. The model may comprise a coupling layer configured to determine an output vector of integer values from an input vector of integer values. The method 800 may correspond to an operation of the system 200 of FIG. 2 or the system 300 of FIG. 3. However, this is not a limitation, in that the method 800 may also be performed using another system, apparatus or device.

The method 800 may comprise, in an operation titled "ACCESSING MODEL", accessing 810 a set of parameters of the model. The model may have been trained on a training dataset according to a method described herein. The set of parameters may comprise parameters of a machine learnable submodel of the coupling layer.

The method 800 may comprise, in an operation titled "OBTAIN INPUT", obtaining 820 a model input, e.g., an input image, and, in an operation titled "APPLY MODEL", applying 830 the model to the input to obtain a model output.

Instead of or in addition to the obtaining 820 and the applying 830, the method 800 may comprise, in an operation titled "OBTAIN OUTPUT", obtaining 840 a model output, and, in an operation titled "APPLY INVERSE", applying 850 an inverse of the model to the model output to obtain a model input, e.g., an input image.

The applying 830 and/or the applying 850 may comprise, in an operation titled "APPLY SUBMODEL", applying 842 the machine learnable submodel of the coupling layer to a first input part of the coupling layer to obtain a submodule output of the machine learnable submodel. The applying 830 and/or the applying 850 may further comprise, in an operation titled "SELECT TRANSFORMATION", selecting 843 a transformation vector based on a discrete probability distribution parameterized based on the submodel output.

It will be appreciated that, in general, the operations of method 800 of FIG. 7 and method 800 of FIG. 8 may be performed in any suitable order, e.g., consecutively, simultaneously, or a combination thereof, subject to, where applicable, a particular order being necessitated, e.g., by input/output relations. Some or all of the methods may also be combined, e.g., method 800 of applying a trained model may be applied subsequently to this trained model being trained according to method 700.

Figure 9:
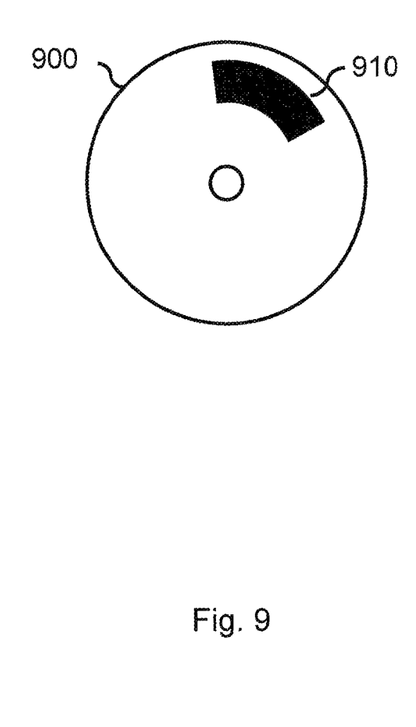
FIG. 9 shows a computer-readable medium comprising data, in accordance with an example embodiment of the present invention.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 900. Alternatively, the computer readable medium 1100 may comprise transitory or non-transitory data 910 representing a set of parameters of an image analysis model trained as described herein, in particular comprising parameters of a coupling layer.

Examples, embodiments or optional features, whether indicated as non-limiting or not, are not to be understood as limiting the invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device including several means, several of these means may be embodied by one and the same item of hardware. The mere fact that certain measures are described separately does not indicate that a combination of these measures cannot be used to advantage.

What is claimed is:

1. A computer-implemented method of training an image analysis model, the image analysis model including a coupling layer configured to determine an output vector of integer values from an input vector of integer values, the method comprising the following steps:

accessing a training dataset, wherein the training dataset including one or more training images;

accessing a set of parameters of the image analysis model, the set of parameters including parameters of a machine learnable submodel of the coupling layer;

applying the image analysis model to a training image of the training dataset to determine a model output, including applying the coupling layer to the input vector to obtain the output vector of integer values by:
dividing the input vector into non-overlapping first and second input parts;
applying the machine learnable submodel of the coupling layer to the first input part to obtain a submodel output of the machine learnable submodel;
sampling a discrete probability distribution to obtain a transformation vector of integers, wherein the discrete probability distribution is parameterized based on the submodel output;
determining a second output part based on the second input part and the transformation vector by transforming the second input part according to the transformation vector using addition or subtraction, and the second output part is an integer result of the transforming of the second input part and is determined without rounding;
combining the first input part and the second output part to obtain the output vector of integer values;

backpropagating the model output through the image analysis model, including estimating a gradient of the sampling of the transformation vector.

2. The method of claim 1, wherein the applying of the machine learnable submodel includes applying a convolutional neural network.

3. The method of claim 2, wherein the sampling of the transformation vector includes sampling from a discretized logistic distribution.

4. The method of claim 3, wherein the estimating of the gradient of the sampling is by a REINFORCE-based gradient estimator.

5. The method of claim 1, wherein the estimating of the gradient of the sampling is by a Gumbel-Softmax gradient estimator.

6. The method of claim 1, wherein the image analysis model is configured to determine a representation of an input image in terms of a set of parameters of a probability distribution.

7. The method of claim 6, further comprising maximising a log-likelihood of the input image.

8. A computer-implemented method of applying an image analysis model, the image analysis model including a coupling layer configured to determine an output vector of integer values from an input vector of integer values, the method comprising the following steps:

accessing a set of parameters of the image analysis model, the image analysis model having been trained on a training dataset, and wherein the set of parameters includes parameters of a machine learnable submodel of the coupling layer, wherein the image analysis model is trained by:
applying the image analysis model to a training image of the training dataset to determine a first model output, including applying the coupling layer to the input vector to obtain the output vector of integer values by:
dividing the input vector into non-overlapping first and second input parts,
applying the machine learnable submodel of the coupling layer to the first input part to obtain a submodel output of the machine learnable submodel,
sampling a discrete probability distribution to obtain a transformation vector from the sampled values, wherein the discrete probability distribution is parameterized based on the submodel output,
determining a second output part based on the second input part and the transformation vector by transforming the second input part according to the transformation vector using addition or subtraction, wherein the transformation vector is a set of integers, and the second output part is an integer result of the transforming of the second input part and is determined without rounding,
combining the first input part and the second output part to obtain the output vector of integer values,
backpropagating the first model output through the image analysis model, including estimating a gradient of the sampling of the transformation vector;
obtaining an input image and applying the image analysis model to the input image to obtain a model output, and/or obtaining a model output and applying an inverse of the image analysis model to the model output to obtain an input image.

9. The method of claim 8, further comprising:
applying the image analysis model to the input image, and applying a lossy or lossless compression function to the model output to obtain a compression of the input image; and/or
applying a lossy or lossless decompression function to a compression of the input image to obtain the model output, and applying the inverse of the image analysis model to the model output to recover the input image.

10. The method of claim 8, further comprising:
applying the image analysis model to the input image to obtain the model output, wherein the model output represents the input image in terms of a set of parameters of a probability distribution; and
determining a conformance value based on the set of parameters, wherein the conformance value indicates a conformance of the input image to the training dataset.

11. The method of claim 8, wherein the model output represents the input image in terms of a set of parameters of a probability distribution, and wherein the method further comprises:
obtaining the model output by sampling the set of parameters from the probability distribution; and
applying the inverse of the image analysis model to the model output to determine a synthetic image representative of the training dataset.

12. A system for training an image analysis model, wherein the image analysis model comprises a coupling layer configured to determine an output vector of integer values from an input vector of integer values, the system comprising:
a data interface configured to access a training dataset, the training dataset including one or more training images, and to access a set of parameters of the image analysis model, the set of parameters including parameters of a machine learnable submodel of the coupling layer;
a processor subsystem configured to train the image analysis model by:
applying the image analysis model to a training image of the training dataset to determine a model output, including applying the coupling layer to the input vector to obtain the output vector of integer values by:
dividing the input vector into non-overlapping first and second input parts;
applying the machine learnable submodel of the coupling layer to the first input part to obtain a submodel output of the machine learnable submodel;
sampling a discrete probability distribution to obtain a transformation vector, wherein the discrete probability distribution is parameterized based on the submodel output;
determining a second output part based on the second input part and the transformation vector by transforming the second input part according to the transformation vector using addition or subtraction, wherein the transformation vector is a set of integers, and the second output part is an integer result of the transforming of the second input part and is determined without rounding;
combining the first input part and the second output part to obtain the output vector of integer values;
backpropagating the model output through the image analysis model,
wherein the backpropagating includes estimating a gradient of the sampling of the transformation vector.

13. A system for applying an image analysis model, the image analysis model including a coupling layer configured to determine an output vector of integer values from an input vector of integer values, the system comprising:
a data interface configured to access a set of parameters of the image analysis model, wherein the image analysis model has been trained on a training dataset, and wherein the set of parameters includes parameters of a machine learnable submodel of the coupling layer, and wherein the image analysis model is trained by system configured to train the image analysis model, the system configured to:
apply the image analysis model to a training image of the training dataset to determine a first model output, including applying the coupling layer to the input vector of integer values by:
dividing the input vector into non-overlapping first and second input parts,
applying the machine learnable submodel of the coupling layer to the first input part to obtain a submodel output of the machine learnable submodel,
sampling a discrete probability distribution to obtain a transformation vector, wherein the discrete probability distribution is parameterized based on the submodel output,
determining a second output part based on the second input part and the transformation vector by transforming the second input part according to the transformation vector using addition or subtraction, wherein the transformation vector is a set of integers, and the second output part is an integer result of the transforming of the second input part and is determined without rounding, combining the first input part and the second output part to obtain the output vector of integer values, and backpropagate the first model output through the image analysis model, including estimating a gradient of the sampling of the transformation vector; and a processor subsystem configured to:
obtain an input image and apply the image analysis model to the input image to obtain a model output, and/or obtain a model output and apply an inverse of the image analysis model to the model output to obtain an input image;

wherein the applying of the image analysis model and/or the applying of the inverse of the image analysis model includes applying the machine learnable submodel of the coupling layer to a first input part of the coupling layer to obtain a submodule output of the machine learnable submodel, and selecting a transformation vector based on a discrete probability distribution parameterized based on the submodel output.

14. The system of claim 13, wherein the system further comprises a sensor interface configured to obtain, from an image sensor, image data of the system and/or of an environment of the system, and wherein the processor subsystem is configured to apply the image analysis model to the image data.

15. A non-transitory computer-readable medium on which is stored a computer program for training an image analysis model, the image analysis model including a coupling layer configured to determine an output vector of integer values from an input vector of integer values, the computer program, when executed by a processor, causing the processor to perform the following steps:

accessing a training dataset, wherein the training dataset including one or more training images;

accessing a set of parameters of the image analysis model, the set of parameters including parameters of a machine learnable submodel of the coupling layer;

applying the image analysis model to a training image of the training dataset to determine a model output, including applying the coupling layer to the input vector by:
dividing the input vector into non-overlapping first and second input parts;
applying the machine learnable submodel of the coupling layer to the first input part to obtain a submodel output of the machine learnable submodel;
sampling a discrete probability distribution to obtain a transformation vector, wherein the discrete probability distribution is parameterized based on the submodel output;
determining a second output part based on the second input part and the transformation vector by transforming the second input part according to the transformation vector using addition or subtraction, wherein the transformation vector is a set of integers, and the second output part is an integer result of the transforming of the second input part and is determined without rounding;
combining the first input part and the second output part to obtain the output vector;

backpropagating the model output through the image analysis model, including estimating a gradient of the sampling of the transformation vector.

* * * * *